Aug. 29, 1944.  I. E. ASKE  2,356,909

PISTON

Filed Oct. 25, 1942

INVENTOR.
IRVING E. ASKE
BY Earl D. Chappell

Patented Aug. 29, 1944

2,356,909

UNITED STATES PATENT OFFICE 2,356,909

PISTON

Irving E. Aske, Muskegon, Mich.

Application October 25, 1943, Serial No. 507,489

11 Claims. (Cl. 309—7)

This invention relates to improvements in pistons. These improvements are adapted more particularly to pistons for internal combustion engines but also to pistons for steam engines and air compressors.

The main objects of the invention are:

First, to provide a piston for controlling the escape or blow-by of gases through the clearance provided between the compression rings and the ring grooves of the piston.

Second, to provide a piston with spaced compression rings in which the pressure of expanding gases in the clearance at the rear of an outer or upper ring is communicated through a passage to the clearance back of an inner or lower ring and in which the inner or lower ring has relatively slight side clearance in its groove, whereby the escape of the expanding gases under pressure through said side clearance, is reduced and whereby said inner or lower ring is urged outwardly to reduce escape of gases between said ring and the cylinder wall, and whereby vertical reciprocation of said lower or inner ring in its groove is reduced with consequent reduction of pounding of the ring against the lands of its groove and of upward pumping of lubricating oil.

Third, to provide an oil-ring construction for a piston in combination with the compression ring structure of the type above set forth that is especially effective in controlling the consumption of lubricating oil.

Objects relating to details and economies of the invention will appear from the description to follow. The invention is defined and pointed out in the claims.

Preferred embodiments of the invention are illustrated in the accompanying drawing, in which.

The following facts are well known to those skilled in the art of engine construction:

First, that combustion gases escape as a blow-by through the conventional operating clearance space provided between the rings and their grooves. If this clearance is lessened, so as to considerably reduce the blow-by therethrough, then the pressure of the explosion gases on the cylinder wall engaging surface of the ring is not balanced by the pressure in the groove back of the ring, which causes the ring to collapse. This collapse of the ring generally known as ring flutter or clatter, results in excessive blow-by and oil flow between the cylinder wall and the cylinder wall engaging surface of the ring.

Second, that excessive blow-by also develops when the clearance space between the ring lands becomes closed off with carbon deposits. This is commonly known as ring sticking and when it occurs the external pressure acting on the cylinder wall engaging face of the ring cannot become balanced by the pressure behind the ring and the ring remains collapsed permitting excessive escape of explosion gases between the face of the ring and the cylinder wall.

Third, that the conventional vertical clearance of the ring in its groove above referred to permits the ring to move upwardly and downwardly, and it is this vertical reciprocating motion that causes the ring to pound the lands of the groove, sometimes disastrously, particularly on aluminum pistons. Also the ring reciprocating in its groove acts as a miniature pump to squeeze the lubricating oil upwardly resulting in excessive consumption thereof.

Fourth, that to control oil consumption a slotted ring is sometimes used to drain off excessive oil on the cylinder wall through holes leading from the oil ring groove. The slots of these rings frequently become clogged with carbon, then the oil ring acts as a solid ring with no drain-off characteristics, resulting in further excessive oil consumption.

It is the purpose of my present invention to greatly minimize or eliminate the common troubles, above mentioned, to wit, excessive blow-by of combustion gases, excessive consumption of lubricating oils, and excessive wear of the cylinder walls, rings, and ring grooves, whereby the operating performance of the engine will be appreciably improved over present practice. I accomplish this improved performance by the construction now described in detail.

Figure 1:
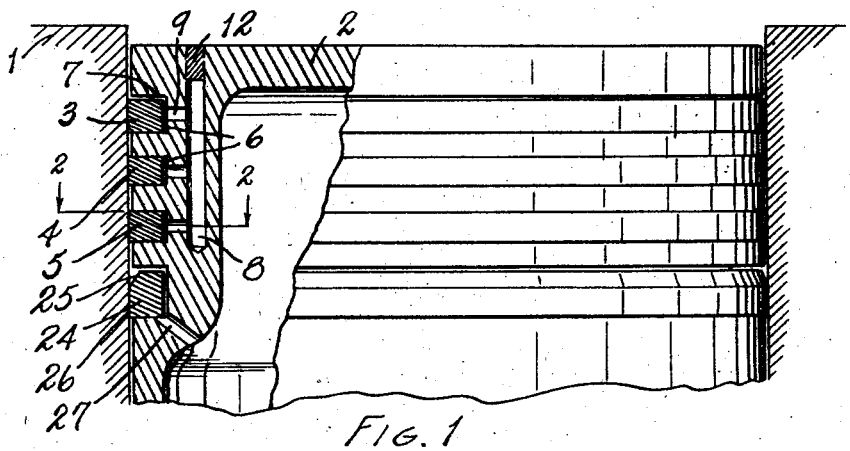
Fig. 1 is a fragmentary view of one of the embodiments of the invention showing the cylinder in vertical section and the piston in side elevation with parts thereof broken away showing the piston in vertical section on line 1—1 of Fig. 2.
Figures 2, 3:
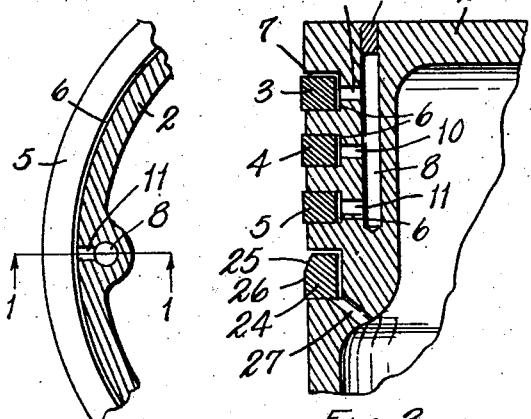
Fig. 2 is a horizontal section of the piston on line 2—2 of Fig. 1.
Fig. 3 is a fragmentary vertical section of the piston similar to Fig. 1 with the cylinder omitted.

Referring to the drawing and of the invention shown in Figs. 1, 2 and 3, the reference numeral 1 designates the cylinder in which operates the piston 2 provided with axially spaced compression ring grooves in which are disposed the rings 3, 4 and 5, of the common split resilient expansible type. All the rings are provided with the conventional back clearances 6 between the depth or bottom of the grooves and the back or inner diameter of the rings. The top or outer ring 3 is also provided with the conventional side clearance of approximately .002 of an inch between the side of the ring and the land of the groove, as shown at 7, to permit the pressure of the explosion gases to flow behind the ring into the back clearance 6, so that the pressure on the back of the ring balances that on the cylinder wall engaging face of the ring thereby preventing collapse of the ring, generally known as ring flutter or clatter. Unless this side clearance 7 is ample to permit sufficient pressure to get behind the ring and prevent collapse of the same, excessive blow-by or escape of explosion gases and flow of lubricating oil takes place between the face of the ring and the cylinder wall. The two lower or inner compression rings 4 and 5 instead of having the conventional side clearance are fitted as close in clearance between the side of a ring and the lands of its groove as manufacturing limits will permit and still provide freedom of motion of the ring in its groove towards and from the cylinder wall. I have found that .0003 of an inch provides sufficient clearance which is about one-fifth as much as normally provided.

In order that the pressure of the explosion gases in the clearance 6 at the back of the ring 3 may be communicated to the clearances 6 at the back of rings 4 and 5 a vertical hole 8 is drilled into the ring belt section of the piston, behind the grooves of the compression rings 3, 4 and 5, and holes 9, 10 and 11 are cross-drilled from these ring grooves to the vertical hole 8. The vertical hole 8 is plugged off from the combustion chamber, not shown, by a plug 12, which is preferably pressed into the top of the hole. The holes 8, 9, 10 and 11 may be of any suitable diameter. For example, for a cylinder having a bore 3¼ inches in diameter, the vertical hole 8 may be approximately $\frac{3}{32}$ to ⅛ of an inch in diameter, and the cross-drilled communicating holes 9, 10 and 11 may be approximately .047, $\frac{1}{16}$ and $\frac{1}{16}$ of an inch in diameter, respectively. Obviously, if desired, the construction above described, for communicating the clearance 6 at the back of ring 3 to clearances 6 at the back of rings 4 and 5 may be duplicated at different points about the circumference of the piston.

In describing the operation of the above described embodiment of the invention, shown in Figs. 1, 2 and 3, a very small portion of the explosion gases escape through the clearance space 7 to the clearance space 6 back of ring 3, then through the cross-drilled hole 9 to the vertical hole 8, through the hole 8 into the holes 10 and 11 and thence to the clearances 6 back of the close fitting rings 4 and 5, where it exerts pressure behind the rings 4 and 5 to force their faces into close engagement with cylinder wall to prevent the escape of explosion gases between said faces and the cylinder wall 1. Since the side clearance between the close fitting rings 4 and 5 and their grooves is about one fifth of the conventional clearance usually allowed, the escape or blow-by of combustion gases through this side clearance is likewise reduced by this amount. By choosing the relative diameters of the holes 8, 9, 10 and 11, preferably that of hole 9 relative to those of the other holes, the extent of pressure of the rings 4 and 5 against the cylinder wall 1 can be regulated to any desired amount on full power of the engine. Obviously, the pressure acting on hole 9 is also limited by the size of the clearance 7 between the side of the ring 3 and the upper land of its groove, and the temperature of the gases escaping through the clearance 7 is reduced by the cooling action of the ring and groove surfaces.

The relatively small side clearance of the rings 4 and 5 in their grooves as above described not only greatly reduces the escape of the explosion gases to the crank case as above described but also greatly reduces vertical reciprocation of these rings in their grooves which correspondingly reduces wear, pounding of the lands of the grooves by the rings and tendency of the rings to pump lubricating oil upwardly. Furthermore, the close fit of the rings 4 and 5 against the lands of their grooves and also against the cylinder wall 1, facilitates rapid transfer heat from the piston through the rings to the cooled cylinder wall with a consequent reduced surface temperature of the piston head as evidenced by its ability to suppress detention, for a given load speed and spark advance.

Figure 4:
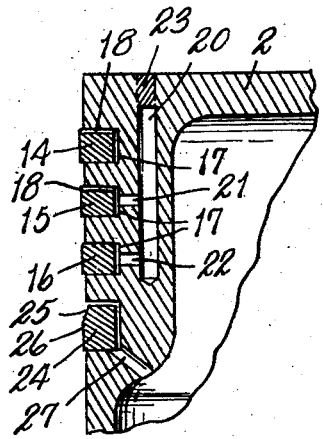
Fig. 4 is a vertical section of the piston on line 4—4 of Fig. 5 showing a second and preferred embodiment of the invention.
Figure 5:
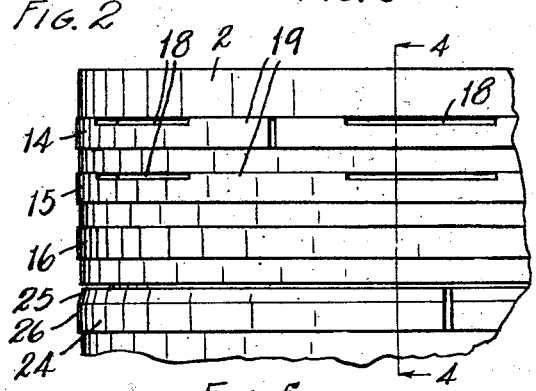
Fig. 5 is a side elevation of the piston of the embodiment of the invention shown in Fig. 4.

In the embodiment of the invention shown in Figs. 4 and 5, the piston 2 is provided with axially spaced compression ring grooves in which are disposed the compression rings 14, 15 and 16 of the split resilient expansible type. All the rings are provided with the conventional back clearances 17 between the depth or rear walls of the grooves and the back or inner diameter of the rings. The two top or outer rings 14 and 15 are of scalloped construction having any suitable number of scallops or depressions 18 separated by alternating raised portions 19, disposed on the upper side of said rings at equal distances about the circumference of the same. Six scallops 18 separated by six alternating raised portions 19, with the area of each scallop substantially equal to that of a raised portion, gives excellent operative results. The rings 14 and 15 are fitted in their grooves with a minimum side clearance of .0003 of an inch, the same as the clearance for the rings 4 and 5 in the embodiment of Figs. 1, 2 and 3, and the depressions 18 may be approximately .008 of an inch deep, which allows ample space for the explosion gases to pass to the clearances 17 back of the rings 14 and 15 and prevent collapse of the same. The lower or inner compression ring 16 is similar to the rings 4 and 5 of the embodiment of Figs. 1, 2 and 3 and is likewise fitted in its groove with a minimum side clearance of .0003 of an inch.

In order that the pressure of the explosion gases in the clearance 17 back of the ring 15 may be communicated to the clearance 17 at the back of ring 16 a vertical hole 20 is drilled into the ring belt section of the piston and holes 21 and 22 are cross-drilled from the ring grooves of the rings 15 and 16 to this vertical hole. The upper end of hole 20 is closed by a plug 23, similar to the plug 12 for the vertical hole 8 previously described. In this embodiment a cross-drilled hole from the groove of the upper ring 14, corresponding to cross-drilled hole 9 of the embodiment of Figs. 1, 2 and 3 may be omitted.

In describing the operation of the embodiment of the invention as shown in Figs. 4 and 5, a small portion of the explosion gases escape through the depressions 18 of the middle compression ring 15 to the clearance space 17 back of said ring, then through the cross-drilled hole 21 to the vertical hole 20, through the hole 20 into the hole 22 and then to the clearance 17, back of the lower compression ring 16, where it exerts pressure behind the ring to force the face thereof against the cylinder wall 1 to prevent collapse of said ring and escape of explosion gases between said ring and the cylinder wall and then to the crank case. Since the side clearance between the close fitting ring 16 and its groove is the same as for rings 4 and 5 in the embodiment of Figs. 1, 2 and 3, the blow-by through this side clearance is correspondingly reduced as for rings 4 and 5, heretofore described.

All the compression rings 14, 15 and 16 having a relatively small side clearance in their grooves as above described, vertical reciprocation of the same in their grooves is greatly reduced, which as for rings 4 and 5 in the embodiment of Figs. 1, 2 and 3, correspondingly reduces wear, pounding of the lands of the grooves, and tendency to pump lubricating oil. This close fit, as for rings 4 and 5, also facilitates rapid transfer of heat from the surface of the piston head to the cooled cylinder walls.

Another important feature of the relatively small side clearance of the compression rings in their grooves in the embodiment of Figs. 4 and 5 as well as that of Figs. 1, 2 and 3, is the reduction of piston slap which normally occurs when too much clearance exists between the piston skirt and the cylinder wall, particularly when an engine is started up cold and the piston has not reached its operating temperature.

The oil ring structure is the same in both embodiments of the invention and comprises an oil ring 24 of solid construction provided with a bevel 25 extending from the upper side of the ring to approximately midway the face of the ring, and at an angle of 15° to the vertical. This provides a relatively small area 26 with high unit pressure for pressing against the cylinder wall. For a ring having a diameter of 3¼ inches, the vertical dimensions from the upper side to the lower side may be approximately $\tfrac{7}{16}$ of an inch and the width of the cylinder wall engaging area 26, $\tfrac{3}{32}$ of an inch. Oil drain holes 27 extend from the normal clearance back of the ring 24 and are provided in number and size as conditions require. This beveled oil ring 24 of solid construction forms an effective combination with the close fitting compression rings and their pressure communicating holes in controlling the consumption of oil. Because of its solid construction there are no oil slots to become clogged, as in conventional oil rings, and therefore there is established an oil control factor that remains fairly constant throughout the wear life of the rings and unaffected by carbon formation.

Another advantage is that the expanding pressure on the rings 4 and 5 or the rings subjected to such pressure is in substantially the proportion or ratio to the pressure on the fuel compression stroke and the pressure of gases on the explosion stroke.

A further advantage resulting from the invention is that the wear on the cylinder wall is more uniform than is the case where a conventional piston is equipped with conventional rings. In such a piston the first compression ring, which is provided with substantial clearance, is subjected to the gases under high pressure and temperature, and in effect floats in the piston ring groove on the explosion stroke, inasmuch as the gas passes entirely around the ring. This results in the ring being forced outwardly with considerable pressure in addition to the inherent pressure of the ring, and commonly results in stepped wear on the cylinder wall when the piston is at the top of its stroke. In my invention this pressure, which is commonly applied to the first piston ring only, is bled off and distributed to the intermediate piston rings, resulting in effective sealing engagement with the cylinder wall and minimizing blow-by, this without the use of expander springs or other booster devices.

Figure 6:
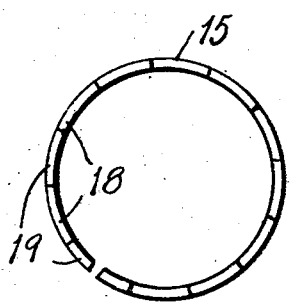
Fig. 6 is a top plan view of an upper compression ring of the embodiments of Figs. 4 and 5.

As pointed out, in Figs. 5 and 6 there is a relatively slight amount of clearance as compared to a conventional piston ring. The lands 19 are held against the top wall of the piston ring groove on the explosion stroke and thus an effective heat transfer contact is provided which effects a substantial reduction in temperature of the ring as compared to a conventional ring having the floating condition which I have explained.

This uniform wear of the cylinder wall is of great advantage as non-uniform wear presents one of the problems in internal combustion engineering. It also relieves the piston rings of wear to which they are necessarily subjected in a non-uniform cylinder. The heat transfer feature is also of advantage in that it reduces carbonization of oil in the piston ring zone and grooves.

Another advantage is that in this embodiment shown in Figs. 5 and 6 the lands of the piston ring are held against the top wall of the piston ring groove with considerable force so that the gas does not force the ring against the cylinder bore with as much pressure as is the case with a ring which has greater clearance, such as shown in Fig. 1. Therefore, the embodiment of Figs. 5 and 6 has certain advantages in addition to those present in the embodiment shown in Fig. 1.

A further important feature of my invention is that the use of expander springs or elements is avoided and it is not necessary to provide rings having a high degree of inherent spring expansibility built into the same during the process of manufacture.

As above described, reference has been made more particularly to the expansion of explosion or combustion gases in the cylinder, but such gases may be steam as in a steam engine, or air as in an air compressor.

The embodiments of the invention which incorporate the principles of the invention in a highly desirable manner have been illustrated and described, though I am aware that other embodiments within the intent of the invention will suggest themselves to those skilled in the art. It should be understood that the foregoing terminology is used only descriptively rather than in any limiting sense, and with full intention to include equivalents of the features shown and described, within the scope of the appended claims.

Having thus described my invention, what I claim as new and desire to secure by Letters Patent, is:

1. The combination of a piston having a plurality of axially spaced compression ring grooves and an oil ring groove provided with drain openings to the interior of the piston, a longitudinal passage at the rear of the compression ring grooves communicating with the bottoms of only the compression ring grooves and otherwise closed, split resilient expansible compression rings arranged within said compression ring grooves, there being a substantial clearance between the rings and the bottoms of the ring grooves, the outer compression ring having such clearance as to permit gases under pressure to flow therearound and into said longitudinal passage, the compression rings arranged in the intermediate grooves having relatively slight side clearance in the order of .0003 of an inch whereby pressure at the rear thereof acts to urge them outwardly and whereby vertical reciprocation of the rings in said intermediate grooves is reduced, and a split expansible ring arranged in said oil groove.

2. The combination of a piston having a plurality of axially spaced compression ring grooves and an oil ring groove provided with drain openings to the interior of the piston, a longitudinal passage at the rear of the compression ring grooves communicating with the bottoms of only the compression ring grooves and otherwise closed, split resilient expansible compression rings arranged within said compression ring grooves, there being a substantial clearance between the rings and the bottoms of the ring grooves, the outer compression ring having such side clearance as to permit gases under pressure to flow therearound and into said longitudinal passage, the compression rings arranged in the intermediate grooves having relatively slight side clearance in the order of .0003 of an inch whereby pressure at the rear thereof acts to urge them outwardly and whereby vertical reciprocation of the rings in said intermediate grooves is reduced, and a split expansible ring arranged in said oil groove.

3. A piston having a plurality of axially spaced compression ring grooves, a passage rearwardly of said grooves and communicating with said grooves at the rear thereof but otherwise closed, split resilient expansible compression rings arranged in said grooves, said rings having a substantial clearance between the same and the rear of their grooves, the outer compression ring having a substantial side clearance whereby gases under pressure are permitted to flow therearound and into said passage, an inner compression ring having its groove connected to said passage and having a relatively slight side clearance in its groove, whereby escape of gases through the side clearance is reduced, and whereby pressure back of said inner ring urges the same outwardly to reduce the escape of gases between said inner ring and cylinder wall, and whereby reciprocation of said inner ring in its groove is reduced.

4. A piston having axially spaced compression ring grooves, a passage communicating certain of said grooves at the rear thereof, split resilient expansible compression rings arranged in said grooves, said rings having a substantial clearance between the same and the rear of the grooves, one of said rings having a substantial side clearance whereby gases under pressure are permitted to flow therearound and into said passage, another of said rings having its groove connected to said passage and having a relatively slight side clearance in its groove to reduce the escape of gases by the ring and also to reduce reciprocation of the ring in its groove, said passage communicating pressure from back of the first mentioned ring to the back of the last mentioned ring.

5. A piston having axially spaced compression ring grooves, a passage rearwardly of said grooves and communicating with certain of the grooves at the rear thereof, split resilient expansible compression rings arranged in said grooves, said rings having a substantial clearance at the rear thereof in said grooves, one of said rings having a relatively slight side clearance in its groove, in the order of .0003 of an inch to reduce reciprocation of said ring in its groove, said ring having a series of spaced depressions in one side thereof to permit gases under pressure to flow therethrough and into said passage, a second of said rings being disposed on the side of the first mentioned ring opposite from said depressions, said second ring having its groove connected to said passage and having relatively slight side clearance in its groove in the order of .0003 of an inch to reduce escape of gases around said ring and also to reduce vertical reciprocation of the ring in its groove.

6. A piston having axially spaced compression ring grooves, a passage connecting certain of said grooves at the rear thereof, split resilient expansible compression rings in said grooves, said rings having a substantial clearance between the same and the rear of their grooves, one of said rings having a relatively slight side clearance in its groove to reduce reciprocation of the same in its groove, said ring having a series of spaced depressions in the side thereof to permit gases under pressure to flow therethrough to said passage, a second of said rings arranged in its groove and spaced from the first mentioned ring on the side thereof opposite from said depressions, said second ring having its groove connected to said passage and having a relatively slight side clearance in its groove, to reduce escape of gases by the ring and also to reduce vertical reciprocation of the ring in its groove.

7. A piston having a plurality of vertically spaced compression ring grooves, split resilient expansible compression rings arranged in said grooves, said rings having a substantial clearance between the same and the rear of their grooves, at least two of the upper rings each having a series of spaced depressions in the upper sides thereof to permit gases under pressure to flow to the clearance to the rear thereof, said upper rings having a relatively slight side clearance in their grooves to reduce reciprocation thereof in their grooves, another of said compression rings arranged in its groove and spaced below said upper rings, a passage communicating the clearance at the rear of said lower ring to the clearance at the rear of the lower of said upper rings, said first mentioned lower ring having relatively slight side clearance in its groove to reduce the escape of gases by the ring and also to reduce vertical reciprocation of the ring it its groove.

8. A piston having axially spaced compression ring grooves, a passage connecting certain of said grooves at the rear thereof but otherwise closed, split resilient expansible compression rings in said grooves, said rings having a substantial clearance at the rear thereof in said grooves, one of said rings permitting a substantial flow of gases under pressure to said passage, another of said rings having its groove connected to said passage and having a relatively slight side clearance in its groove to reduce the escape of gases by the ring and also to reduce reciprocation of the ring in its groove.

9. A piston having vertically spaced compression ring grooves, a passage connecting certain of said grooves at the rear thereof but otherwise closed, split resilient expansible compression rings arranged in said grooves, said rings having a substantial clearance between the same and the rear of the grooves, at least one of the upper of said rings permitting gases under pressure to flow thereby to said passage, a lower of said rings having its groove connected to said passage and having a relatively slight side clearance in its groove to reduce the escape of gases by the ring and also to reduce vertical reciprocation of the ring in its groove, an oil ring groove spaced below said compression ring grooves and provided with drain openings to the interior of the piston, and an oil ring in said groove beveled from its upper side to substantially midway its outer face, said oil ring being of solid construction in cross section.

10. A piston having vertically spaced compression ring grooves, a passage communicating the rear portions of certain of the grooves but otherwise closed, split resilient expansible compression rings arranged in said grooves, said rings having a substantial clearance between the same and the rear of their grooves, an upper of said rings having its groove connected to said passage and permitting gases under pressure to flow to said passage, a lower of said rings having its groove connected to said passage and having a relatively slight side clearance in its groove to reduce the escape of gases by the ring and also to reduce reciprocation of the ring in its groove, an oil ring groove spaced below the compression ring grooves and provided with drain openings to the interior of the piston, an oil ring in said groove and beveled at an angle of approximately 15° to the vertical and from the upper side of the ring to approximately midway the outer face thereof, said oil ring being solid in cross section.

11. A piston having vertically spaced compression ring grooves, a passage connecting the rear portions of certain of said grooves, split resilient expansible compression rings arranged in said grooves, said rings having a substantial clearance between the same and the rear of their grooves, an upper of said rings having a relatively slight side clearance in its groove to reduce reciprocation of the ring in its groove, said ring having a series of spaced depressions in its upper surface to permit gases under pressure to flow to the clearance at the rear thereof, a lower of said rings having a relatively slight side clearance in its groove to reduce the escape of gases by said ring and vertical reciprocation of ring in its groove, said passage connecting the clearance at the rear of said upper ring to the clearance at the rear of said lower ring, an oil ring groove beneath the compression ring grooves and provided with drain openings to the interior of the piston, an oil ring solid in cross section disposed in said oil ring groove, said ring being beveled at approximately an angle of 15° to the vertical from the upper side of the ring to approximately midway the outer face of the ring.

IRVING E. ASKE.